United States Patent
Olmez et al.

(10) Patent No.: US 6,238,571 B1
(45) Date of Patent: May 29, 2001

(54) REMOVAL OF CONTAMINANT METALS FROM WASTE WATER

(75) Inventors: Ilhan Olmez, Instanbul (TR); Francis X. Pink, Norwood, MA (US); Duran Karakas, Ankara (TR); Duane S. Boning, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/153,420

(22) Filed: Sep. 15, 1998

(51) Int. Cl.$^7$ ........................................... C02F 1/52
(52) U.S. Cl. .................. 210/722; 210/724; 210/757; 210/759; 210/758; 210/767
(58) Field of Search .................... 210/695, 722, 210/724, 748, 757, 759, 758, 807, 767

(56) References Cited

U.S. PATENT DOCUMENTS

| | | | |
|---|---|---|---|
| 2,768,746 | 10/1956 | Colburn | 210/1.5 |
| 3,441,502 | 4/1969 | Tenorio | 210/49 |
| 3,697,420 | 10/1972 | Blaisdell et al. | 210/42 |
| 3,931,007 | 1/1976 | Sugano et al. | 210/50 |
| 3,959,145 | 5/1976 | Lundquist et al. | 210/223 |
| 4,039,447 | 8/1977 | Muira et al. | 210/42 S |
| 4,169,053 | 9/1979 | Sakakibara et al. | 210/49 |
| 4,285,819 | 8/1981 | Yen et al. | 210/679 |
| 5,122,279 | * 6/1992 | Guess . | |
| 5,182,014 | * 1/1993 | Goodman . | |
| 5,298,168 | * 3/1994 | Guess . | |
| 5,389,262 | * 2/1995 | Guess . | |
| 5,505,857 | * 4/1996 | Misra . | |
| 5,685,993 | 11/1997 | Liu | 210/695 |
| 6,004,069 | * 12/1999 | Sudbury . | |

OTHER PUBLICATIONS

"Iron," CRC Handbook of Chemistry and Physics, 59th edn., 1978, p. B–30–31.*

"Copper CMPs: A Question of Tradeoffs," semiconductor international, May, 2000, published at http://209.67.253.149/semiconductor/issues/issues/2000/200005/six0005cmp.asp.*

"The role of chemistry in chemical mechanical polishing, Part III: Copper CMP," semiconductor online, Jul. 18, 2000, published at http://www.semiconductoronline.com/content/news/article.asp?DocID={79DED670–5CA3–11D4–8C55–009027DE0829}&Bucket=HomeFeaturedArtic.*

Wang et al., "Fundamental Study of an Ambient Temperature Ferrite Process in the Treatment of Acid Mine Drainage," Environmental Science & Technology 30:2604–2607 (1996).

Kirman, "Cooper Removal From CMP Wastewater," Users Group: Northern California Chapter American Vacuum Society, Environmental Safety and Health Issues in CMP Workshop, pp. 1–12 (1998).

* cited by examiner

Primary Examiner—Chester T. Barry
(74) Attorney, Agent, or Firm—Clark & Elbing, LLP; Mary Rose Scozzafava

(57) ABSTRACT

A method for the removal of copper from waste waters includes providing a solution to be treated, the solution comprising copper; introducing a source of ferric ions and a source of ferrous ions into the solution; and adjusting the pH of the solution to promote formation of a copper-containing ferrite precipitate, whereby the solution is depleted in copper. In instances where the solution contains ferric ions, the method includes introducing a source of ferrous ions into the solution to obtain a solution comprising ferric ions and ferrous ions; and adjusting the pH of the solution to promote formation of a copper-containing ferrite precipitate, whereby the solution is depleted in copper. The method may include a step for removing oxidizers by introducing a source of ferric ions or ferrous ions to the solution to decomposed the oxidizer; introducing a source of ferric ions or ferrous ions to the solution to obtain a solution comprising ferric ions and ferrous ions; and adjusting the pH of the solution to promote formation of a copper-containing ferrite precipitate, whereby the solution is depleted in copper. The method may be applied to other aqueous systems for the removal of a variety of metals from waste water. Ferrite may be removed by magnetic separation.

29 Claims, No Drawings

REMOVAL OF CONTAMINANT METALS FROM WASTE WATER

BACKGROUND OF THE INVENTION

This invention relates to the removal of heavy metals from waste waters. In particular, the invention relates to copper removal from Chemical Mechanical Polishing (CMP) solutions.

Discharge of heavy metals into the environment is restricted under the Clean Water Act of 1977. Heavy metal contamination may arise from a variety of sources, such as in the mining, mineral processing, electroplating and electronics/semiconductor industries. Current discharge limits for various metals under 40 C.F.R. §433 (Metals Finishing) are Cu: 2.07 mg/L; Cr: 1.71 mg/L; Ni: 2.38 mg/L; and Zn: 2.61 mg/L. State and local regulations must also be complied with, which may vary greatly from region to region.

With the introduction of copper into integrated circuits as a replacement for aluminum, the semiconductor industry has become interested in removal of heavy metals such as copper from industrial waste waters. In this interconnect process, trenches are etched in the inter-layer dielectric (ILD). The entire surface is then deposited with a copper film, the bulk of which is then polished back to leave the embedded metal feature. Thus, the bulk of the deposited copper is removed by CMP. Unlike the polishing of silicon and silicon dioxide which produce fairly environmentally benign compounds, the formation of waste polishing solutions containing high levels of copper represents a significant environmental hazard.

The CMP technique, as employed in the semiconductor industry, is based on the combined effect of chemical dissolution of the copper into the polishing slurry and the physical removal of the copper from the surface by abrasive particles, such as alumina, ceria, silica and manganese oxides. This combined chemical/mechanical action efficiently removes the excess copper. CMP solutions for metal removal are typically acidic (low pH values). Furthermore, these solutions generally contain varying concentrations of suspended, sub-micron abrasive particles. Finally, the user may add chemicals which transform the as-received solution into one which provides specific properties such as physical and/or chemical compatibility with coating and substrates, pH adjustment and removal rates. The copper in the spent CMP solution is primarily in divalent form, although it may exist in metallic or oxide forms. Methods for rendering the CMP waste non-hazardous should be effective in removing copper simultaneously and quantitatively regardless of the CMP solution composition.

Current methods of extracting heavy metals from waste waters suffer from significant limitations. Present techniques for the recovery of dissolved metals include ion exchange, precipitation and collection using environmentally benign chemicals, electrochemical processing, liquid/liquid extractors and ultrafiltration.

The various methods which are currently used in the semiconductor industry for the post-use processing of CMP solutions are discussed by L. Kirman in "Copper Removal from CMP Wastewater" (presented at Environmental Safety and Health Issues Workshop of the American Vacuum Society, San Jose, Calif., Apr. 1, 1998). As it relates to CMP solutions, purification typically is a two-step—and sometimes three-step—process. In the first step, the abrasive slurry particles, e.g., 100–200 nm alumina or silica particles, are removed by microfiltration or ultrafiltration or, in some cases, chemically-assisted precipitation. The second step involves the removal of the dissolved copper. Copper is typically removed by chemical precipitation, ion exchange or electrolytic reduction.

Users of CMP solutions often add hydrogen peroxide to the solution to increase the oxidizing efficiency for copper removal. There is substantial concern about the presence of oxidizers in the solution because they may interfere with other treatment steps. In particular, they have a deleterious effect on ion exchange processes. Oxidizers are removed typically by dissociation chemical reduction, ultraviolet irradiation, catalytic reduction with activated carbon or electrochemical reduction. Disadvantages to these processes are the need for a dual (or three-step) system to first remove undissolved particles and then remove dissolved metals, increasing the expense and complexity of purification process.

Chemical precipitation methods have long been used in a variety of industries to remove copper by complexation with sulfides, organic ligands such as ethylenediamine-tetraacetic acid (EDTA), or dithiocarbamates. However, such techniques often require the removal of the oxidizer prior to precipitation, and require the use of expensive and/or potentially toxic materials. In addition, the precipitate must be removed by an additional step, usually filtration. Filtration may have the further disadvantage of mixing copper waste with other solids, thereby increasing the volume of copper-containing waste. Accordingly, it is desirable to minimize the copper solids waste volume.

Ion exchange has been used for many years to remove copper from waste water. However, this process may be expensive and time consuming. Ion exchange is highly selective and is capable of reducing contamination levels to far below permissible Environmental Protection Agency (EPA) emissions levels. The additional levels of purification achievable by ion exchange may not be necessary in semiconductor wafer manufacturing (covered under EPA 40 C.F.R. §433) or in many geographic locations with varying regulatory requirements, and the additional costs associated with ion exchange may not be justified.

Direct electrolytic reduction using high surface area cathodes has been demonstrated to remove copper from a solution. Unfortunately, the ability to remove copper in a short time is inversely proportional to the copper concentrations. At the low concentrations found in CMP solutions, electrolytic reduction may not be achievable over a practical time scale. Further, metallic of oxidized copper is not removed.

A widely employed method for removing dissolved metals involves pH control of the waste water. At a particular (typically, basic) pH, the heavy metal of interest is converted into the corresponding metal hydroxide which precipitates and which may then be separated by filtration from the water waste. However, the hydroxide precipitates are flocculent and removal by filtration or settling techniques is difficult and incomplete. In addition, the presence of an oxidizer and its effect on the precipitation reaction is unknown and would have to be resolved.

U.S. Pat. No. 3,931,007 discloses the removal of heavy metals from aqueous solutions by precipitation of ferrites, $M_xFe_{3-x}O_4$, where M is typically the divalent form of a transition metal element. The prior art requires conversion of ferrous ions in solution into the higher oxidation state ferric ion. Ferrite formation involves the addition of ferrous ions and alkaline material to heavy metal-containing water; followed by oxidation of the ferrous component into ferric material and the precipitation of the ferrite.

The process possesses many advantages over simple metal hydroxide precipitation processes. The precipitated ferrite is chemically stable and may be removed by magnetic separation. The product ferrite may incorporate a variety of divalent cations and so is suitable for the simultaneous separation of a large number of heavy metals from waste or rinse waters. However, prior art processes have typically required elevated temperatures and/or additional oxidation steps in order to obtain the desired ferrite. For example, the process of U.S. Pat. No. 3,391,007 forms ferrites only at temperatures above 60° and requires oxidation of several hours.

Thus, there remains a need for a process of removing contaminant metals from waste waters which is rapid, inexpensive and simple.

In particular, there remains a need for a process of removing copper from CMP solutions which is economical, results in the substantially complete removal of copper and which is compatible with the semiconductor fabrication process.

There remains a need for a process for removing contaminant metals which minimizes waste requiring further treatment, handling, storage or destruction.

There further remains a need for a process with a minimal number of discrete processing steps, and in particular, a process which does not require separate steps for removal of suspended solids or oxidizer.

These and other needs remaining in the prior art are met by the present invention.

SUMMARY OF THE INVENTION

In one aspect of the invention a CMP polishing solution containing copper is treated by introducing a source of ferric ions and a source of ferrous ions into the solution. The pH of the solution is adjusted to promote formation of a copper-containing ferrite precipitate, whereby the solution is depleted in copper.

In another aspect of the invention, a CMP polishing solution containing copper is treated by introducing a source of ferrous ions into the solution to obtain a solution comprising ferric ions and ferrous ions. The pH of the solution is adjusted to promote formation of a copper-containing ferrite precipitate, whereby the solution is depleted in copper.

In yet another aspect of the invention, a CMP polishing solution comprising copper and an oxidizer is treated by introducing a source of ferric ions or ferrous ions to the solution, whereby the oxidizer is decomposed. A source of ferric ions or ferrous ions is introduced to the solution to obtain a solution comprising ferric ions and ferrous ions; and the pH of the solution is adjusted to promote formation of a copper-containing ferrite precipitate, whereby the solution is depleted in copper.

In preferred embodiments, the polishing solution is depleted in copper by more than about 90%, preferably more than about 95% and more preferably more than about 98%. The copper is depleted to a concentration of less than about 3 ppm, preferably to a concentration of less than about 1.0 ppm, more preferably to a concentration of less than about 0.3 ppm, and most preferably to a concentration of less than 0.1 ppm. In other preferred embodiments, the total iron residue content in the waste water is less than about 4 ppm and preferably less than about 1.0 ppm.

In another aspect of the invention, waste water is treated by introducing ferric- and ferrous-containing compounds into an aqueous medium comprising a metal; and adjusting the pH of the aqueous medium to promote formation of a metal-containing ferrite precipitate, whereby the solution is depleted in the metal.

A method is provided for treating waste water by providing an aqueous medium to be treated, the aqueous medium comprising a metal and an oxidizer; introducing a source of ferric ions or ferrous ions into the aqueous medium, whereby the oxidizer is decomposed; introducing a source of ferric ions or ferrous ions into the aqueous medium; and adjusting the pH of the aqueous medium to promote formation of a metal-containing ferrite precipitate, whereby the solution is depleted in the metal. The metal is selected from the group consisting of Ti, V, Cr, Mn, Co, Ni, Cu, Zn, Y, Cd, Sn, Hg and Bi.

The invention may further include collecting the ferrite precipitate, such as by filtration, magnetic separation and gravitational settling. The oxidizer may be removed using conventional techniques such as chemical reduction, ultraviolet irradiation, catalytic reduction with activated carbon and electrochemical reduction.

DETAILED DESCRIPTION OF THE INVENTION

The current invention employs the co-precipitation of trivalent and divalent iron ions with a contaminant metal ion at elevated pHs. The resulting precipitate is the superparmagnetic compound, magnetite, with the composition $Fe^{2+}O \cdot Fe_2^{3+}O_3$ or $Fe_3O_4$. Substitutions of the ferric or ferrous ions with divalent or trivalent ions of an appropriate ionic radius result in a wide range of ferrites with varied properties. For example. The ionic radius of $Fe^{2+}$ and $Fe^{3+}$ are 0.74 and 0.64 Å, respectively. The cupric ion, $Cu^{2+}$, with an ionic radius of 0.72 Å substitutes for the ferrous ion resulting in a ferrite with the composition $(FeCu)O \cdot Fe_2O_3$. Thus, any divalent or trivalent ion with the appropriate radius may be used in the method of the invention. Suitable divalent ions include, but are not limited to, divalent ions of Ti, V, Cr, Mn, Co, Ni, Cu, Zn, Y, Cd, Sn, Hg and Bi. Preferred ions include Cr, Mn, Co, Ni, Cu and Zn. A particularly preferred ion is the divalent copper ion in the purification of CMP waste slurries.

According to the method of the invention, a mixture of ferrous ($Fe^{2+}$) and ferric ($Fe^{3+}$) ions is added to waste water containing the metal(s) of interest. The pH of the solution is adjusted, to promote formation of metal oxides. A pH of greater than 10 is generally required. Upon addition, the divalent metals precipitate from solution as ferrites. Because the solution contains both the divalent and trivalent iron species required for ferrite formation, no additional oxidation step or prolonged mixing step is required. Treatment at elevated temperatures also is not required. Thus, substantially complete removal of the contaminant metal is accomplished at room temperature in a very short time, typically on the order of seconds to minutes. In practice, it may be desirable to age the precipitate to improve or increase the ferrite crystallite formation which simplifies the separations step.

The ferrite compounds are paramagnetic and may be easily removed from solution by magnetic collection. Permanent or electromagnetic magnets may be employed. In addition to solvated ions, there is a possibility that the metal may exist as submicron metallic or metal oxide particles in the waste water. These species would likely be incorporated into the precipitate via occlusion or scavenging, thus adding another advantage to the precipitation process by avoiding the need for an additional purification step. Other particulate matter present in the waste water, such as alumina or silica fines, may also be scavenged or occluded by the ferrite precipitate. This may eliminate the need for or simplify a separate separation of the particulate impurities in the waste water.

Any conventional soluble ferric and ferrous ion sources may be used in the practice of the invention. Suitable ferrous ion sources include, but are not limited to, ferrous sulfate heptahydrate ($FeSO_4 \cdot 7H_2O$), ferrous cloride tetrahydrate ($FeCl_2 \cdot 4H_2O$) and ferrous nitrate hexahydrate ($Fe(NO_3)_2 \cdot 6H_2O$). Suitable ferric ion sources include, but are not limited to, ferric chloride hexahydrate ($FeCl_3 \cdot 6H_2O$), ferric nitrate enneahydrate ($Fe(NO_3)_3 \cdot 9H_2O$) and ferric sulfate enneahydrate $Fe_3(SO)_{42} 9H_2O$.

Further, it has been determined that the ferric and ferrous ion sources may be successfully employed over a wide compositional range. Thus, substantially complete copper ion removal was obtained using solutions with $[Fe^{2+}]/[Fe^{3+}]$ ratios ranging from about 5.0 to about 0.5. Preferred ranges include $[Fe^{2+}]/[Fe^{3+}]$ ratios ranging from about 4.75 to about 0.75. Even over such wide, and clearly non-stoichiometric, ranges the formation of ferrite and precipitation of ferrous and ferrite ions is substantially complete i.e., less than 10 ppm iron, preferably less than 3 ppm iron and more preferably less than 1 ppm iron remain in solution after ferrite precipitation. For the purpose of this discussion, "substantial complete removal" means less than 3.0 ppm contaminant metal remaining in solution. Preferably less than 1.0 ppm and more preferably less than 0.3 ppm contaminant metal remain in solution after treatment.

In some cases, the waste water to be purified may already contain either ferric ions or ferrous ions. For example CMP polishing solutions may contain ferric nitrate as an oxidizer. Thus, it may be necessary to add only the ion which the solution is lacking (here, ferrous iron). The success of removing copper over a large $[Fe^{2+}]/[Fe^{3+}]$ range provides the opportunity for a convenient process that requires less attention and provides greater success rates than one with more stringent boundaries. Therefore, changes in the ratio due mainly to oxidation of the ferrous ion, hydrolysis, iron oxide or hydroxide precipitation, etc, are within limits, non-interfering reactions of the process.

In addition, it has also been demonstrated that substantially complete precipitation of the contaminant metal can be effected with addition of very low levels of ferrous and ferric ion sources. It is possible to obtain greater than 90% removal, preferably greater than 95% removal and most preferably greater than 98% removal of contaminant metal using a ferrous/ferric ion solution having a total iron ion content ranging from 0.44 mmol up to 14.6 mmol. This represents a large range of iron concentration and demonstrates the flexibility of the purification method. In these examples, the iron is present in a excess relative to the copper; however, there does not appear to be fixed lower limit to iron ion concentration. Lower iron levels may be possible. This is advantageous as one wishes to minimize the total bulk material requiring handling and disposal. Reduction of the amount of material used in the purification process is economically desirable.

As noted above, CMP polishing solutions will typically contain an oxidizer, generally hydrogen peroxide. Hydrogen peroxide presents some complications in the treatment of spent CMP polishing solutions. Thus, any method which addresses the removal of copper from the solution desirably also provides for the decomposition or removal of the oxidizer.

In a preferred embodiment, the method of the invention provides a simple and effective method for removal of oxidizers such as hydrogen peroxide ($H_2O_2$), sodium peroxide ($Na_2O_2$), potassium peroxide ($K_2O_2$), potassium iodate ($KIO_3$) or even ferric nitrate ($Fe(NO_3)_3$) from the waste water. The inventive method is attractive because it removes the oxidizer in a process compatible with the ferrite precipitation method used to remove copper. Therefore, additional complicating and non-compatible steps are not required.

According to the method of the invention, ferric ion first is introduced into 1% (w/w) hydrogen peroxide-containing waste water in an amount which initiates decomposition of the oxidizer. It was observed that, upon addition of 0.05 g (0.12 mmol) ferric nitrate into a 40 mL CMP solution having a copper concentration of 10 ppm Cu, the pH of the solution decreased from 4 to 1.5. Furthermore, addition of ferric nitrate resulted in the decomposition of hydrogen peroxide, even though hydrogen peroxide was present in a 30-fold excess.

Without being bound to any particular mode of operation, it is believed that hydrogen peroxide is decomposed in a catalytic reaction which involves initial reduction of the ferric to ferrous ion and subsequent regeneration of the ferric ion until the peroxide is consumed. Initially, ferric ion reacts with hydrogen peroxide according to the redox reaction set forth in equation (1):

$$2Fe^{3+}+H_2O_2 \rightarrow 2\ Fe^{2+}+O_2\ (g)+2H^+ \epsilon^0_{rea}=0.86\ V \quad (1)$$

The ferrous ion is also capable of reacting with hydrogen peroxide according to the well-known Fenton reaction in which ferrous ion reacts with hydrogen peroxide to yield ferric ion and the hydroxyl radical according to equation (2). See, Lee et al. *Anal. Chem.* 62(21):2381 (1990).

$$Fe^{2+}+H_2O_2 \rightarrow Fe^{3+}+OH^-+OH \quad (2)$$

Thus, the ferrous ion generated in eq (1) may undergo further reaction with hydrogen peroxide, ultimately regenerating ferric ion according to eq (2). The reaction proceeds as described above until all peroxide is consumed. According to the proposed method, addition of only a small amount of ferric ion is needed to decompose hydrogen peroxide. The resulting treated water solution is depleted in oxidizer and contains both ferric and ferrous ions. The actual proportion of each ion is determined by the equilibrium position of the reactions upon consumption of all the hydrogen peroxide in the system. As stated above, it is desired to use a minimum iron concentration in order to minimize the resultant solid waste volume.

In other embodiments of the invention, ferrous ion may be used instead to decompose the hydrogen peroxide. While not being bound by any particular mode of operation, it is hypothesized that the hydrogen peroxide is first consumed by reaction according to eq (2) followed by reaction of the thus-generated ferric ion according to eq (1).

The consumption of hydrogen peroxide occurs rapidly and is complete in a less than one hour, typically less than 30 minutes and more preferably in less than 10 minutes. The rate of decomposition is dependent upon a variety of factors, including the amount of ferric (or ferrous) ion added to the solution. Increasing levels of ferric ion reduces the time required for hydrogen peroxide decomposition.

In other embodiments, conventional methods may be used to remove the oxidizer. Conventional methods include, but are not limited to, chemical reduction, ultraviolet irradiation, catalytic reduction with activated carbon or electrochemical reduction. Use of activated carbon is a preferred conventional method.

Once the oxidizer is decomposed, the waste water may be further treated to remove copper or other metal contaminants. Thus, ferrous ion is added to the solution in an amount which is selected to maintain the $Fe^{2+}/Fe^{3+}$ ratio in a range identified as that which promotes the precipitation of ferrite from the solution. As noted above, the $Fe^{2+}/Fe^{3+}$ range which provides substantially complete precipitation is quite broad. Additional considerations include the desire to minimize amount of iron compounds added to the waste water. By reducing the amount of added iron, the volume of ferrite which must be collected and disposed of is minimized. The pH of the solution then is adjusted to promote formation of metal oxides. Upon addition, the metals precipitate from solution as ferrites in the manner described herein above.

This invention is described in the following examples which are presented for the purpose of illustration only and are in no way intended to be limiting of the invention, the full scope of which is set forth in the claims which follow.

EXAMPLE 1

The example demonstrates greater than 95% removal of copper from a copper-containing CMP slurry after it had been used in a polishing operations ("as received" CMP solution). There was no hydrogen peroxide present in the slurry. The slurry had an initial copper concentration of 40 ppm, but was diluted to final concentrations of 5 ppm for testing purposes. This concentration is still above the EPA's permissible daily effluent level of 3.38 mg/l.

In this series of experiments, 5 mL of a 0.62 N ferric chloride hexahydrate solution (3.1 mmol) was added to a 5 mL sample of the spent copper-containing CMP slurry. Variable amounts of ferrous ions (ferrous sulfate heptahydrate) was added to the solution as shown in Table 1. Following addition of the ferric ion and ferrous ion solutions, 3 mL conc. $NH_4OH$ was added. All additions were carried out at room temperature. Precipitation began immediately upon addition of ammonium hydroxide and was complete in less than five minutes. The supernatant liquor was free of any suspended material, indicating that during the precipitation the alumina particulants also were collected by the precipitate. Both copper and iron contents of the supernatant liquid were determined by inductively coupled plasma emission spectroscopy using standardized copper and iron solutions. Detection limits for these elements is approximately 0.01 µg/mL.

Results are reported in Table 1 and demonstrate that ferrite precipitation is a viable method for recovering copper from a peroxide-free CMP solution. Highly effective copper removal was achieved for a wide range of ferrous ion levels, ranging from $Fe^{2+}/Fe^{3+}$ ratios of 3.71 to 0.84.

TABLE 1

Ferrite formation using 3.1 mM $Fe^{+3}$ and 3 mL $NH_4OH$

| Sample | $Fe^{2+}$ (mmol) | $[Fe^{2+}]/[Fe^{3+}]$ | starting Cu (ppm) | final Cu (ppm) | % Cu removal |
|---|---|---|---|---|---|
| 1a | 11.5 | 3.71 | 5 | 0.158 | 96.8 |
| 1f | 10 | 3.22 | 5 | 0.074 | 98.5 |
| 1b | 6.2 | 2.0 | 5 | 0.128 | 97.4 |
| 1c | 4.4 | 1.42 | 5 | 0.069 | 98.6 |
| 1d | 2.6 | 0.84 | 5 | 0.276 | 94.5 |

TABLE 1-continued

Ferrite formation using 3.1 mM $Fe^{+3}$ and 3 mL $NH_4OH$

| Sample | $Fe^{2+}$ (mmol) | $[Fe^{2+}]/[Fe^{3+}]$ | starting Cu (ppm) | final Cu (ppm) | % Cu removal |
|---|---|---|---|---|---|
| 1e | 0.89 | 0.29 | 5 | 2.57 | 48.5 |
| 1g | 0.40 | 0.13 | 5 | 1.24 | 75.2 |

EXAMPLE 2

The example demonstrates greater than 95% removal (<0.3 ppm) of copper from a copper-containing "as received" CMP slurry. There was no hydrogen peroxide present in the slurry. The slurry had an initial copper concentration of 40 ppm, but was diluted to final concentrations of 4 ppm or 5 ppm for testing purposes.

In this series of experiments, the amount of ferric ion (present as $FeCl_3 \cdot 6H_2O$) was significantly reduced 10-fold from 3.1 mmol to 0.31 mmol. Variable amounts of ferrous ions (ferrous sulfate heptahydrate) were added to the solution as shown in Table 2. Following addition of the ferric ion and ferrous ion solutions, 0.5 mL conc. $NH_4OH$ was added. All additions were carried out at room temperature. Precipitation began immediately upon addition of ammonium hydroxide and was complete in less than five minutes. Results are reported in Table 2 and demonstrate that ferrite precipitation is a viable method for recovering copper from a peroxide-free CMP solution over a wide range of compositional variation. Highly effective copper removal was achieved for a wide range of ferrous ion levels, ranging from $Fe^{2+}/Fe^{3+}$ ratios of 4.74 to 0.58.

TABLE 2

Ferrite formation using 0.31 mM $Fe^{+3}$ and 0.5 mL $NH_4OH$

| Sample | $Fe^{2+}$ (mmol) | $[Fe^{2+}]/[Fe^{3+}]$ | starting Cu (ppm) | final Cu (ppm) | % Cu removal |
|---|---|---|---|---|---|
| 2a | 1.47 | 4.74 | 4 | 0.158 | 96.0 |
| 2b | 1.33 | 4.29 | 4 | 0.11 | 97.3 |
| 2c | 1.12 | 3.61 | 4 | 0.088 | 97.8 |
| 2d | 0.79 | 2.55 | 4 | 0.080 | 98.0 |
| 2e | 0.54 | 1.74 | 4 | 0.11 | 97.3 |
| 2f | 0.31 | 1.00 | 4 | 0.210 | 94.7 |
| 2g | 0.26 | 3.0 | 5 | 0.23 | 94.4 |
| 2h | 0.24 | 2.7 | 5 | 0.28 | 95.4 |
| 2i | 0.16 | 1.9 | 5 | 0.24 | 95.2 |
| 2j | 0.12 | 1.4 | 5 | 0.24 | 95.2 |
| 2k | 0.05 | 0.58 | 5 | 0.120 | 97.6 |

EXAMPLE 3

This example demonstrates the catalytic decomposition of hydrogen peroxide with ferric ion in a 10 ppm copper-containing CMP slurry and subsequent removal of copper by ferrite precipitation. Analysis of the CMP slurry prior to treatment indicated a copper content of 9.82 ppm and iron content of 0.20 ppm.

A 40 mL sample of CMP slurry containing approximately 10 ppm copper with 1 (w/w) % hydrogen peroxide was treated with varying amounts of ferric chloride. Decomposition of hydrogen peroxide was confirmed by a decrease in the pH of the solution and gas evolution. Reaction was allowed to continue until no further gas evolution was observed. In a typical example, pH of the solution decreased from about 4.0 to 1.4. The reaction proceeds spontaneously and rapidly at room temperature. Optionally, the slurry may be stirred to shorten the reaction time.

Once decomposition was complete, variable amounts of ferrous sulfate were added. A base such as potassium hydroxide (KOH) ammonium hydroxide ($NH_4OH$) or sodium hydroxide (NaOH) was then added to increase the pH to above 11.0 to initiate formation of ferrite. Following the addition of base, the solution pH was measured and the base was added into the solution until the pH is about 12.0. The precipitation is formed almost immediately, as in Examples 1 and 2.

Results are reported in Table 3 and demonstrate that ferrite precipitation is a viable method for recovering copper from a peroxide-containing CMP solution over a wide range of compositional variation. Highly effective copper removal was achieved for a wide range of ferrous ion levels, ranging from $Fe^{2+}/Fe^{3+}$ ratios of 4.74 to 0.58.

TABLE 3

Ferrite formation in a peroxide-containing CMP solution with 10 ppm copper

| No. | $Fe^{2+}$ (mmol) | $Fe^{3+}$ (mmol) | $[Fe^{2+}]/[Fe^{3+}]$ | base# (mL) | final Cu (ppm) | final Fe (ppm) | % Cu removal |
|---|---|---|---|---|---|---|---|
| ref* | 0 | 0 | 0 | 0 | 9.82 | 0.20 | —/— |
| 1 | 0.37 | 0.61 | 0.61 | $NH_4OH$ (5); KOH (2) | 0.66 | 0.45 | 93.3 |
| 2 | 0.74 | 1.22 | 0.61 | $NH_4OH$ (5); KOH (2) | 0.86 | 2.11 | 89.7 |
| 3 | 1.11 | 1.83 | 0.61 | $NH_4OH$ (5); KOH (2) | 0.56 | 7.89 | 93.3 |
| 4 | 1.48 | 2.45 | 0.61 | $NH_4OH$ (5); KOH (2) | 0.53 | 1.71 | 93.3 |
| 5 | 1.85 | 3.06 | 0.61 | $NH_4OH$ (5); KOH (2) | 0.40 | 1.25 | 95.2 |
| 6 | 0.37 | 0.72 | 0.51 | $NH_4OH$ (5); KOH (2) | 0.74 | 0.39 | 91.1 |
| 7 | 0.74 | 1.44 | 0.51 | $NH_4OH$ (5); KOH (2) | 1.77 | 1.79 | 82.0 |
| 8 | 1.11 | 2.16 | 0.51 | $NH_4OH$ (5); KOH (2) | 0.81 | 2.29 | 90.3 |
| 9 | 1.48 | 2.88 | 0.51 | $NH_4OH$ (5); KOH (2) | 0.49 | 0.89 | 94.1 |
| 10 | 1.85 | 3.60 | 0.51 | $NH_4OH$ (5); KOH (2) | 0.37 | 1.88 | 95.6 |
| 11 | 0.74 | 1.22 | 0.61 | KOH (5.5) | 0.084 | 0.49 | 99.0 |
| 12 | 1.11 | 1.83 | 0.61 | KOH (5.5) | 0.064 | 0.25 | 99.3 |
| 13 | 1.48 | 2.45 | 0.61 | KOH (5.5) | 0.058 | 0.31 | 99.3 |
| 14 | 0.093 | 0.18 | 0.52 | KOH (2) | 0.102 | 1.32 | 98.9 |
| 15 | 0.19 | 1.08 | 0.16 | KOH (2) | 0.066 | 0.61 | 99.3 |
| 16 | 0.22 | 1.15 | 0.19 | KOH (2) | 0.063 | 0.68 | 99.3 |
| 17 | 0.037 | 0.79 | 0.47 | KOH (2) | 0.250 | 0.77 | 97.3 |
| 18 | 0.056 | 0.83 | 0.067 | KOH (2) | 0.220 | 0.78 | 97.6 |
| 19 | 0.19 | 0.76 | 0.25 | KOH (2) | 0.195 | 0.77 | 97.9 |
| 20 | 0.11 | 0.93 | 0.12 | KOH (2) | 0.118 | 0.97 | 98.7 |
| 21 | 0.30 | 0.58 | 0.52 | KOH (2) | 0.071 | 0.66 | 99.2 |
| 22 | 0.19 | 0.36 | 0.53 | KOH (5) | 0.136 | 5.74 | 98.4 |
| 23 | 0.28 | 0.54 | 0.52 | KOH (5) | 0.111 | 2.17 | 98.7 |
| 24 | 0.37 | 0.72 | 0.51 | KOH (5) | 0.077 | 0.46 | 99.1 |
| 25 | 0.56 | 1.08 | 0.52 | KOH (5) | 0.061 | 0.55 | 99.3 |
| 26 | 0.74 | 1.44 | 0.51 | KOH (5) | 0.058 | 0.49 | 99.3 |
| 27 | 0.93 | 1.80 | 0.52 | KOH (5) | 0.056 | 0.42 | 99.4 |
| 28 | 1.11 | 2.16 | 0.51 | KOH (5) | 0.056 | 0.41 | 99.4 |
| 29 | 1.30 | 2.52 | 0.52 | KOH (5) | 0.054 | 0.38 | 99.4 |
| 30 | 1.48 | 2.88 | 0.51 | KOH (5) | 0.055 | 1.05 | 99.4 |
| 31 | 0.19 | 1.26 | 0.15 | KOH (5) | 0.211 | 8.14 | 97.6 |
| 32 | 0.28 | 0.54 | 0.52 | KOH (5) | 3.078 | 6.74 | 64.7 |
| 33 | 0.37 | 0.72 | 0.51 | KOH (5) | 0.266 | 5.77 | 97.0 |
| 34 | 0.46 | 0.90 | 0.51 | KOH (5) | 0.144 | 3.96 | 98.4 |

*analysis of starting composition
CONC. $NH_yOH$, KOH is prepared as 3M solutions As the results in Table 3 demonstrates, precipitation of ferrite is substantially complete. Most processes resulted in greater than 90% and even greater than 95% removal of copper. A significant majority of the examples gave greater than 97% removal of copper. Advantageously, such high levels of copper removal may be accomplished with very low amounts of added iron compounds. Note for instance, sample number 14 in which addition of only 0.27 mmol of iron (mixture of both ferrous and ferric compound) resulted in 98.9% removal of copper.

EXAMPLE 4

This example demonstrates the catalytic decomposition of hydrogen peroxide with ferrous ion in a 10 ppm copper containing CMP slurry. A sample of CMP slurry containing approximately 10 ppm copper with 1 (w/w)% hydrogen peroxide was treated with ferrous sulfate. Decomposition of hydrogen peroxide was confirmed by gas evolution. Reaction was allowed to continue until no further gas evolution was observed.

Once decomposition is complete, a ferric ion source may be added to the solution. A base such as KOH or NaOH may then be added to increase the pH to above 11.0 to initiate formation of ferrite. The precipitation is expected to form as in Example 3.

What is claimed is:

1. A method of treating a chemical mechanical polishing (CMP) solution, comprising:

providing a CMP solution to be treated, the solution comprising abrasive particles and copper;

introducing a ferric ion-containing compound and a ferrous ion-containing compound into the solution; and adjusting the pH of the solution to promote formation of a copper-containing ferrite precipitate, whereby the solution is depleted in copper.

2. A method of treating a chemical mechanical polishing (CMP) solution, comprising:

providing a CMP solution to be treated, the solution comprising abrasive particles, copper and ferric ions;

introducing a ferrous ion-containing compound into the solution to obtain a solution comprising ferric ions and ferrous ions;

adjusting the pH of the solution to promote formation of a copper-containing ferrite precipitate, whereby the solution is depleted in copper.

3. A method of treating a chemical mechanical polishing (CMP) solution, comprising:

providing a CMP solution to be treated, the solution comprising abrasive particles, copper and an oxidizer;

introducing at least one of a ferrous ion-containing compound or a ferric ion-containing compound to the solution, whereby the oxidizer is decomposed; and introducing a source of either ferric ions or ferrous ions to the solution after decomposition of the oxidizer to obtain a solution comprising ferric ions and ferrous ions; and adjusting the pH of the solution to promote formation of a copper-containing ferrite precipitate, whereby the solution is depleted in copper.

4. The method of claim 3, wherein the oxidizer comprises an oxidizer selected from the group consisting of hydrogen peroxide, sodium peroxide, potassium peroxide, potassium iodate and ferric nitrate.

5. The method of claim 3, wherein the amount of said source added after decomposition of the oxidizer is selected to provide a $Fe^{2+}/Fe^{3+}$ ratio in the range of about 4.74 to 0.58.

6. The method of claim 1, 2, or 3, wherein the polishing solution is depleted in copper by more than 90%.

7. The method of claim 1, 2, or 3, wherein the polishing solution is depleted in copper by more than 95%.

8. The method of claim 1, 2, or 3, wherein the polishing solution is depleted in copper by more than 98%.

9. The method of claim 1, 2 or 3, wherein the copper is depleted to a 10 concentration of less than 3 ppm.

10. The method of claim 1, 2 or 3, wherein the copper is depleted to a concentration of less than 1.0 ppm.

11. The method of claim 1, 2 or 3, wherein the copper is depleted to a concentration of less than 0.3 ppm.

12. The method of claim 1, 2 or 3, wherein the copper is depleted to a concentration of less than 0.1 ppm.

13. The method of claim 1, 2 or 3, wherein the $Fe^{2+}/Fe^{3+}$ ratio is in the range of about 0.5 to about 5.0.

14. The method of claim 1, 2, or 3, further comprising the step of separating the ferrite precipitate from the CMP solution, wherein the total iron content in the solution after ferrite formation and separation is less than about 4 ppm.

15. The method of claim 14, wherein the total iron content after separation is less than about 3 ppm.

16. The method of claim 15, wherein the total iron content after separation is less than about 1 ppm.

17. The method of claim 1, 2 or 3, wherein pH is adjusted by addition of base.

18. The method of claim 17, wherein the base is selected from the group consisting of potassium hydroxide, ammonium hydroxide and sodium hydroxide.

19. The method of claim 1, 2 or 3, wherein the pH is adjusted to a value greater than about 10.

20. The method of claim 1 or 2, wherein the solution comprises an oxidizer and the oxidizer is removed using a method selected from the group of techniques consisting of chemical reduction, ultraviolet irradiation, catalytic reduction with activated carbon, and electrochemical reduction.

21. A method of treating waste water, comprising:

providing an aqueous medium to be treated, the aqueous medium comprising metal and an oxidizer;

introducing at least one of a ferric-ion containing compound or ferrous ion-containing compound into the aqueous medium, whereby the oxidizer is decomposed;

introducing a source of at least one of ferric ions or ferrous ions into the aqueous medium after decomposition of the oxidizer to obtain a solution comprising ferric ions and ferrous ions; and adjusting the pH of the aqueous medium to promote formation of a metal-containing ferrite precipitate, whereby the solution is depleted in the metal.

22. The method of claim 21, wherein the metal is selected from the group consisting of Ti, V, Cr, Mn, Co, Ni, Cu, Zn, Y, Cd, Sn, Hg and Bi.

23. The method of claim 21, wherein the metal comprises copper.

24. The method of claim 21, wherein the aqueous medium is more than 95% depleted in heavy metal.

25. The method of claim 21, wherein the oxidizer is selected from the group consisting of hydrogen peroxide, $Na_2O_2$, $K_2O_2$, $KIO_3$ and ferric nitrate.

26. The method of claim 1, 2, 3, or 21, further comprising: collecting the ferrite precipitate.

27. The method of claim 26, wherein the collection is accomplished by a method selected from the group consisting of filtration, magnetic separation and gravitational settling.

28. The method of claim 1, 2, or 3, wherein the step of adjusting the pH of the solution to promote formation of a copper-containing ferrite precipitate includes incorporation of particulate matter in the precipitate.

29. The method of claim 28, wherein the particulate matter is selected from the group consisting of abrasive particles, metallic particles and metal oxide particles.

\* \* \* \* \*